(12) United States Patent
Bensberg et al.

(10) Patent No.: US 10,282,351 B2
(45) Date of Patent: May 7, 2019

(54) USING STATISTICS FOR DATABASE PARTITION PRUNING ON CORRELATED COLUMNS

(71) Applicant: SAP SE, Walldorf (DE)

(72) Inventors: Christian Bensberg, Heidelberg (DE); Norman May, Karlsruhe (DE); Lars Fricke, Bad Schoenborn (DE)

(73) Assignee: SAP SE, Walldorf (DE)

( * ) Notice: Subject to any disclaimer, the term of this patent is extended or adjusted under 35 U.S.C. 154(b) by 804 days.

(21) Appl. No.: 14/827,407

(22) Filed: Aug. 17, 2015

(65) Prior Publication Data

US 2017/0052989 A1 Feb. 23, 2017

(51) Int. Cl.
*G06F 16/22* (2019.01)

(52) U.S. Cl.
CPC ................... *G06F 16/2282* (2019.01)

(58) Field of Classification Search
USPC .......................................................... 707/609
See application file for complete search history.

(56) References Cited

U.S. PATENT DOCUMENTS

| | | | | |
|---|---|---|---|---|
| 6,269,375 B1 * | 7/2001 | Ruddy | .............. | G06F 17/30339 |
| 6,438,562 B1 * | 8/2002 | Gupta | ................. | G06F 16/2272 |
| | | | | 707/696 |
| 6,999,967 B1 * | 2/2006 | Ghazal | ................ | G06F 16/2456 |
| 8,321,420 B1 * | 11/2012 | Sinclair | ............. | G06F 17/30321 |
| | | | | 707/741 |
| 8,515,904 B1 * | 8/2013 | Dwyer | .............. | G06F 17/30194 |
| | | | | 707/609 |
| 9,600,513 B2 * | 3/2017 | Bourbonnais | ..... | G06F 17/30371 |
| 2004/0148293 A1 * | 7/2004 | Croisettier | ........ | G06F 17/30336 |
| 2005/0132123 A1 * | 6/2005 | Glaum | ....................... | G06F 8/63 |
| | | | | 711/100 |
| 2007/0078813 A1 * | 4/2007 | Beavin | .............. | G06F 17/30454 |
| 2007/0143557 A1 * | 6/2007 | Uppala | .................. | G06F 3/0607 |
| | | | | 711/165 |
| 2007/0143564 A1 * | 6/2007 | Uppala | ............. | G06F 17/30575 |
| | | | | 711/173 |
| 2009/0063396 A1 * | 3/2009 | Gangarapu | ....... | G06F 17/30321 |
| 2009/0150336 A1 * | 6/2009 | Basu | .................. | G06F 17/30595 |
| 2012/0166400 A1 * | 6/2012 | Sinclair | ............. | G06F 17/30315 |
| | | | | 707/692 |

(Continued)

*Primary Examiner* — Cam Linh T Nguyen
(74) *Attorney, Agent, or Firm* — Fish & Richardson P.C.

(57) ABSTRACT

A system includes a database having one or more tables having multiple partitions. The database includes memory modules to store the multiple partitions, a query processor, a data manipulation language (DML) processor configured to process operations to manipulate data in one or more of the partitions and a statistics module. For each partition, the statistics module maintains a partition profile and stores the partition profile in a statistics cache. The partition profile includes at least a first interval of data range values per column for one or more columns. The statistics module updates at least the first interval of a partition profile for a partition with new data range values responsive to the DML processor processing an operation to manipulate data in the partition. The database includes a partition pruning module that is configured to include partitions responsive to a received query based on the partition profile.

10 Claims, 3 Drawing Sheets

(56) References Cited

U.S. PATENT DOCUMENTS

| | | | |
|---|---|---|---|
| 2013/0166556 A1* | 6/2013 | Baeumges | G06F 17/30339 |
| | | | 707/737 |
| 2015/0095307 A1 | 4/2015 | Bensberg et al. | |
| 2015/0106407 A1* | 4/2015 | Adayilamuriyil | ............................. |
| | | | G06F 17/30595 |
| | | | 707/804 |
| 2016/0371328 A1* | 12/2016 | Li | G06F 17/30442 |

* cited by examiner

USING STATISTICS FOR DATABASE PARTITION PRUNING ON CORRELATED COLUMNS

TECHNICAL FIELD

This description relates to using statistics for database partition pruning on correlated columns.

BACKGROUND

Businesses may use multiple business process applications and/or services in their business operations. In order to accomplish various tasks, the applications and/or services may access various data, which can be stored in various databases and tables. The data that is accessed by the applications and/or services can be stored based on the age, importance, and/or any other factors related to the data. It is desirable for the applications and/or services to interact with the data in an efficient and time-saving manner and to avoid unnecessary data loading and processing costs.

SUMMARY

According to one general aspect, a system for pruning one or more partitions of a table having multiple partitions using statistics of the partitions includes a database having one or more tables having multiple partitions, where a partition scheme of the partitions is based on a value range of a first column in each of the partitions. The database further includes memory modules storing one or more of the multiple partitions of the tables, a query processor configured to receive a query, a data manipulation language (DML) processor configured to process operations to manipulate data in one or more of the partitions and a statistics module that is operably coupled to the DML processor and to a statistics cache. For each partition, the statistics module maintains a partition profile and stores the partition profile in the statistics cache. The partition profile has at least a first interval of data range values per column for one or more columns, where the statistics module is configured to update at least the first interval of a partition profile for a partition with new data range values responsive to the DML processor processing an operation to manipulate data in the partition. The database includes a partition pruning module that is operably coupled to the query processor, the DML processor and the statistics module, where the partition pruning module is configured to include partitions responsive to a received query based on the partition profile.

In another general aspect, a system for pruning one or more partitions of a table having multiple partitions using statistics of the partitions includes a database having one or more tables having multiple partitions, where the partitions are distributed across multiple nodes in a distributed environment and where a partition scheme of the partitions is based on a value range of a first column in each of the partitions. The database further includes on each of the multiple nodes memory modules storing one or more of the multiple partitions of the tables, a query processor configured to receive a query, a data manipulation language (DML) processor configured to process operations to manipulate data in one or more of the partitions and a statistics module that is operably coupled to the DML processor and to a statistics cache. For each partition, the statistics module maintains a partition profile and stores the partition profile in the statistics cache. The partition profile has at least a first interval of data range values per column for one or more columns, where the statistics module is configured to update at least the first interval of a partition profile for a partition with new data range values plus a buffer amount responsive to the DML processor processing an operation to manipulate data in the partition. The database includes a partition pruning module that is operably coupled to the query processor, the DML processor and the statistics module, wherein the partition pruning module is configured to include partitions responsive to a received query based on the partition profile.

In another general aspect, a computer-implemented method for pruning one or more partitions of a table having multiple partitions using statistics of the partitions includes storing one or more partitions of one or more tables of a database in memory modules and processing operations to manipulate data in one or more of the partitions. The method includes, for each of the partitions, maintaining a partition profile and storing the partition profile in a statistics cache, the partition profile having at least a first interval of data range values per column for one or more columns and updating at least the first interval of a partition profile for a partition with new data range values responsive to receiving an operation to manipulate data in the partition.

The details of one or more implementations are set forth in the accompanying drawings and the description below. Other features will be apparent from the description and drawings, and from the claims.

DETAILED DESCRIPTION

Figure 1:
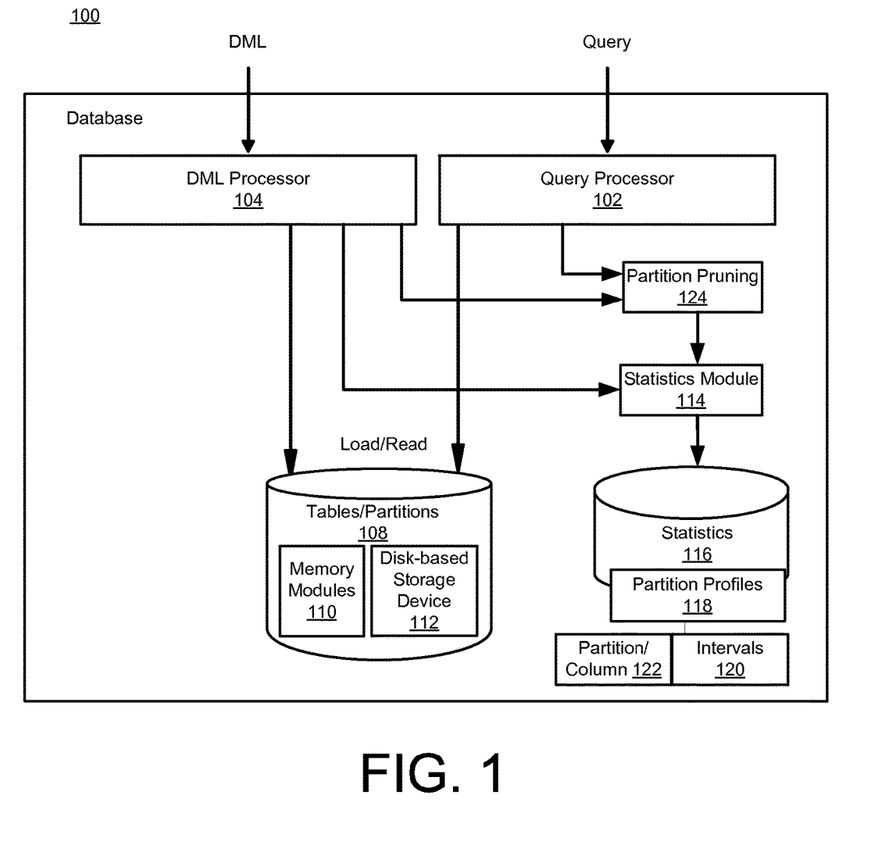
FIG. 1 is an example block diagram of a database.

FIG. 1 is an example block diagram of a database 100. The database 100 includes a query processor 102, a data language manipulation (DML) processor 104 and multiple tables 108. The database 100 contains data stored in the tables 108. In one example implementation, the database 100 may include an in-memory database. The database 100 receives prepared calls or queries at the query processor 102 for data stored in the tables 108 and to return a result to the received query. The prepared calls or queries may be received from an application running of a client device (not shown) that is in communication with the database 100. Prior to executing the received query, the database 100 may prepare a plan for executing the query in order to optimize the database resources and to obtain and return a result to the query in a cost-efficient and effective manner.

The tables 108 may be non-partitioned and/or partitioned. Data in the tables 108 may be stored across multiple partitions. Thus, when a query is received by the query processor 102, for example from an application, one or more partitions may need to be joined together in order to return a result to the query. The partitions may be stored on a single node or across multiple nodes in a distributed environment. The example described in FIG. 2 below illustrates partitions stored across multiple nodes in a distributed environment. Processing of individual partitions takes place in parallel by multiple processors, if the required tasks allow independent execution. This is especially true in distributed environments where these tasks are even being executed on different nodes. In both cases, portions of the query are being executed individually (on respective nodes) and are used to form a result.

In one example implementation, the query processor 102 may include a structured query language (SQL) processor. In this example, the queries received by the SQL processor may be SQL queries in the format of an SQL statement. Other types of query processors may be implemented as part of the database 100 and different query statement strings or formats may be used as appropriate with the type of query processor being implemented. With respect to FIG. 1, various examples will be discussed in terms of the query processor 100 as being implemented as an SQL processor. It is understood that these are just examples and other types of query processors and statements may be used to obtain data from the database 100.

The query processor 102 is configured to accept the query string and analyze the query string. As part of the analysis, the query processor 102 determines whether or not one or more partitions need to be joined in order to return a result to the query. In this manner, an application issuing the query does not need to know the particular partitions that need to be joined when issuing the query. If the query processor 102 determines that the query string contains at least one join, then the query processor 102, in cooperation with other components, such as a join engine (not shown), determines the partitions to join, which may be according to a plan, and returns a result to the query using the joined partitions.

The tables 108 may be stored on memory modules 110. The memory modules 110 may include random access memory (RAM) modules, which may be used to store the full database. In some implementations, one or more portions of the tables 108 may be stored on a disk-based storage device 112. For example, the disk-based storage device 112 may be used to store data that is accessed infrequently such as historical data.

As mentioned above, the tables 108 may be partitioned. The tables 108 may be partitioned and the partitions may reside in the memory modules 110 and/or the disk-based storage device 112. Each partition of the table includes multiple columns. The partitions may be partitioned using one of the columns as a partitioning column. For example, the partitioning column may be a time-based column, such as a date column, such that the partitions are partitioned based on date ranges, where older partitions are considered historical partitions and a most recent partition is considered a current partition or an active partition. Data may be moved from a current partition to an historical partition. Other columns other than a date column may be used as the partitioning column.

The database 100 includes a statistics module 114 that is coupled to a statistics cache 116. The statistics module 114 calculates and prepares a partition profile 118 for each partition, where the partition profile 118 is stored in the statistics cache 116. The partition profile 118 is a data file or a record that contains the statistics for the partition, including one or more intervals 120 for one or more of the columns 122. The statistics module 114 obtains the information for the partition profile from the data and the values of the data stored in each of the partitions. For instance, the partition profile 118 may include one interval for a column, which simply may be a minimum value for the column and a maximum value for the column. The partition profile 118 may store the interval data as a range of "from-to" values. The partition profile 118 may include more than one interval for a column. For instance, the partition profile 118 may include a first range of values (e.g., a first range of "from-to"

values) and a second range of values (e.g., a second range of "from-to" values), in order to make the partition profile more granular. Multiple different intervals may be included as part of the partition profile.

In general, it has been found that columns other than the partitioning column are generally correlated to the partitioning column. The values of one or more columns may correlate with the values of another column. For example, if a time-based column is the partitioning column, other columns and the data in those columns may generally be correlated to the time-based column. An identification number column or sequencing number column, for instance, may generally correlate to the time-based column. As the time increases, so does the identification number or sequencing number increase.

A query statement being processed by the query processor 102 may include a selection criteria based on a column that is different from the partitioning column. Since it has been found that other columns generally may correlate to the partitioning column, this information may be used to determine which partitions to include as part of the query processing, wherein one or more partitions may be excluded, or pruned, from the query processing based on the selection column. The database 100 includes a partition pruning module 124 to determine which partitions to include and/or exclude as part of the query processing using the partition profiles 118 stored in the statistics cache 116. The use of correlated columns to prune partitions to process queries is described in more detail in U.S. application Ser. No. 14/043, 281, filed Oct. 1, 2013, titled "Transparent Access to Multi-Temperature Data," which is hereby incorporated by reference in its entirety.

The database 100 includes the DML processor 104. The DML processor 104 is configured to process operations to manipulate data in one or more of the partitions of the tables 108. For instance, an application running on a client device (not shown) may communicate an operation (a DML operation), also known and illustrated as DMLs, to the database 100 to manipulate data in the tables 108. The DML processor 104 may process operations to manipulate data that includes inserts of new data, updates to existing data, deletes of data and upserts of data. Data manipulation, also referred to as tasks manipulations, by the DML processor 104 includes all of those types of data-related changes to information in the partitions.

The DML processor 104 is operably coupled to and interfaces with the statistics module 114. When a DML operation is performed by the DML processor 104 on one or more of the partitions, the DML processor 104 may cause the statistics module 114 to update the partition profiles for the affected partitions. In response to the DML operation, the partition profile in the statistics cache 116 may be invalidated and a new partition profile may replace the invalidated partition profile, where the new partition profile includes the updated statistics to reflect the changes made by the DML operation. The intervals of any column of data affected by the DML operation may be updated if the DML operation causes a change in one of the end values represented by the interval in the partition profile. In this manner, the partition profiles remain updated to service the partition pruning module 124 when new queries are received by the query processor 102 so the partition pruning module 124 can accurately determine which partitions to include to return a result to the query. Since the partition pruning module 124 relies on statistics to prune partitions, these statistics have to be accurate at any time. Otherwise, partitions might not get considered during execution and the execution may result in incorrect results returned by the database. The partition pruning module 124 may simply check the one or more of the intervals of one or more of the columns against the criteria contained in the query, including correlating against columns not included in the query criteria, to determine which partitions to include to return a result to the query. The statistics module 114 may return "false positives" though. That is, the statistics module 114 returns that a partition stores a value, when in fact the partition does not store the value. This way the overall functionality is not as good as it could be, but the database 100 always returns correct results.

The DML processor 104 can obtain changes to min and max values easily because new data is inserted into a delta index that is write-optimized. In one implementation, the internal structure of the delta index is a B* tree. This data structure allows to read the min and max values with logarithmic time. The delta index is periodically merged into the main index. The main index includes a sorted dictionary. The min and max values can be obtained in constant time.

The DML processor 104 also is operably couple to and interfaces with the partition pruning module 124. During a DML operation, the partition pruning module 124 may determine which partitions can be excluded from the DML operation by interfacing with the partition profiles 118 for the partitions stored in the statistics cache 116. The partition pruning module 124 may access the partition profiles 118 through the statistics module 114. In this manner, during DML operations, only the affected partitions may be accessed because the partition pruning module 124 includes only the needed partitions and excludes the partitions that are not needed to fulfil the particular DML operation.

For instance, during a DML update operation, for a data record containing a particular value in a column being updated, the partition pruning module 124 may look up the partition profiles to determine on which partition(s) to perform the update operation. This may be performed on partitions that include current and/or historical data. The partition pruning module 124 may determine which partition or partitions need to be included even if the column being affected is not the partitioning column. That is, the partition pruning module 124 may determine which partitions to include using the fact that the columns may be correlated to one another and the fact that the partition profile may include interval data information for many, if not all of the columns, including the column on which the partitioning is based.

During DML processing, unique constraints have to be checked. That is the database 100 has to ensure the uniqueness of primary keys. In the following example, a table has a primary key on the column ID, but is partitioned on column CREATE_DATE. Without the use of statistics module 114, the DML processor 104 would be required to the uniqueness of the primary key across all partitions of the table. The partition pruning functionality described above may similarly be used for partition pruning on correlated columns by leveraging the statistics module 114 to prune partitions in which no violation with newly expected data is expected.

As discussed above, when a DML operation is performed, the statistics for the partition need to be updated and the new statistics need to be reflected in the partition profile. This applies to any type of DML operation including inserts, updates, deletes, upserts and other DML operations. In one implementation, the statistics module 114 may update the partition profiles and the intervals for the affected columns by changing the interval values to match to reflect the actual range values for the columns. For example, if the current interval for a column includes the data range values 550-1200 and the DML operation includes a record for the column with the value 1201, then the interval may be updated to 550-1201. This approach may be acceptable for tables residing on a single node. However, it may be desirable to use a different approach for situations involving a table with partitions distributed across multiple nodes or even for other situations involving all the partitions on a single node.

For example, in a distributed environment, the statistics cache 116 may be replicated in each of the nodes. That is, the statistics cache 116 may include that partition profiles 122 for each of the partitions of the table on each node whether or not the partition resides on that particular node. In this manner, when a query or a DML operation is received on one node the appropriate processor may interface with the statistics module 114, the statistics cache 116 and the partition pruning module 124 residing on the node where the query or DML operation was received in order to determine which partitions need to be included to satisfy the query or perform the DML operation, even if those affected partitions reside on a different node.

When a DML operation is received at one node, the statistics module 124 on the node sends a signal to make a remote call to the statistics modules 124 on the other nodes to invalidate the statistics cache for the partition profiles affected by the DML operation. Then, when the partition profile is updated on the node, the node sends a remote call to update and synchronize the partition profiles on the other nodes. To perform this sequence or a similar sequence of steps for each DML operation received at a node, may cause unacceptable processing overhead costs and inefficiencies in the processing of the DML operations.

Instead, a different approach may be applied in order to eliminate some remote calls and to improve processing efficiency when performing DML operations and pruning operations. The statistics may be updated with the actual values plus a buffer (also referred to as a cushion). In response to a DML operation, the intervals for a partition profile may be updated with the actual value plus a buffer. A remote call may be made to update the statistics cache on the other nodes with the updated interval for the partition profile. Then, for one or more subsequent DML operations that affect this partition or other partitions, no remote calls may need to be made because the interval has already been updated to include potential subsequent values for the interval. Partition pruning may be performed by the partition module 124 using the updated values that include the actual value plus the buffer. While the potential exists for a partition to be included (or fail to be excluded) for a particular query or DML operation because of the buffer value, the number of remote calls to invalidate the statistics cache and to update the partition profiles on each node will be reduced, thus having the technical effect of increasing database performance and overall database efficiency.

For example, if the current interval for a column includes the data range values 550-1200 and the DML operation includes a record for the column with the value 1201, then the interval may be updated to 550-1210, which is the actual value 1201 plus a buffer of 9. A remote call to the other nodes is made from the node receiving the DML operation to invalidate the existing partition profile in the statistics cache on the other nodes and to update the statistics cache on the other nodes with the updated interval. Then, when a query is received on one of the nodes, the query processor through the pruning module and statistics module may check the partition profile to determine if that partition needs to be included to return a result to the query, where the partition profile includes the update interval of 550-1210.

Figure 2:
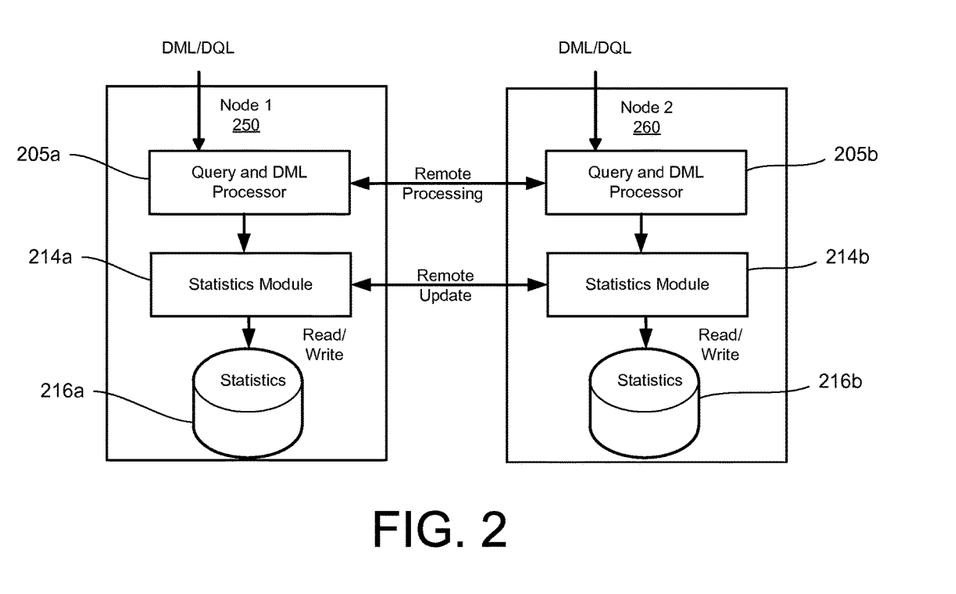
FIG. 2 is an example block diagram of portions of the database of FIG. 1 distributed across multiple nodes.

Referring to FIG. 2, an example block diagram illustrates a database 200 distributed across multiple nodes, which in this example include Node 1 (250) and Node 2 (260). Each of the nodes 250 and 260 may include one or more of the partitions for one or more tables of the database 200. For instance, the database 200 of FIG. 2 may include the database 100 distributed across the multiple nodes 250 and 260. Each of the nodes 250 and 260 may be a computing device, such as a server, that is capable of and configured to include the components illustrated in FIG. 1. The nodes 250 and 260 may communicate with one another through a network, such as a wired or wireless network, including the Internet, in order to perform remote processing for query and DML operations and to perform remote updates of the statistics module and statistics cache. For the sake of simplicity, FIG. 2 illustrates only a portion of the components that are illustrated in FIG. 1, but it is understood that the other components are included.

On each of the nodes 250 and 260, the database 200 illustrates a combined query and DML processor 205a and 205b, a statistics module 214a and 214b and a statistics cache 216a and 216b. While the query and DML processors are illustrated as separate components in FIG. 1 and a combined component in FIG. 2, it is understood that either situation is possible and contemplated. Query operations and DML operations may be received by either node 250 and 260. Query and DML operations received on one node may affect the other node, because the other node may include one or more partitions that may be needed to perform the operation.

As discussed above, each of the statistics modules 214a and 214b may prepare and maintain statistics on each partition in a partition profile that is stored in the respective statistics cache 216a and 216b. The partition profiles stored in the statistics cache 216a and 216b include copies of the same information. For the partitions served by node 250, the statistics module 214a prepares and maintains the partition profiles for those partitions and a copy is stored in the statistics cache 216a and a copy is communicated to the statistics module 214b for storage in the statistics cache 216b. Similarly, for the partitions served by node 260, the statistics module 214b prepares and maintains the partition profiles for those partitions and a copy is stored in the statistics cache 216b and a copy is communicated to the statistics module 214a for storage in the statistics cache 216a.

When a DML operation is received at the query and DML processor 205a on node 250, the statistics module 214a updates the statistics, including the partition profile, for any partitions stored on node 250. The query and DML processor 205a also communicates the DML operation to the query and DML processor 205b on node 260. The query and DML processor 205b passes the DML operation to the statistics module 214b and the statistics module 214b updates the statistics, including the partition profile, for any partitions stored on node 260. As discussed above, the statistics modules 214a and 214b update that partition profiles by changing the interval for one or more columns by an actual value plus a buffer in response to the DML operation. The statistics modules 214a and 214b then communicate the updated partition profiles to each other using remote calls. Then, for one or more subsequent DML operations, the statistics modules 214a and 214b may not need to update the partition profiles in response to the DML operations, because any updates to the intervals have already been included by the previous update and the buffer amount. This eliminates the need to perform any remotes calls for these one or more subsequent DML operations. This has a direct technical effect of increasing database performance and efficiency during DML operations by reducing a number of remote calls made between nodes, such as nodes 250 and 260. While this example merely illustrates two nodes, other examples may include a database having tables that are partitioned across many, many nodes, which may result in a dramatic increase in database performance and efficiency.

In one implementation, when a new DML operation includes a value that exceeds the buffer, then an update to the partition profile is performed, including updating the intervals with actual values plus a new buffer. In other implementations, the partition profiles may be updated on a more periodic base even if the buffer value has not been exceeded by a particular DML operation.

As discussed above, the partition pruning modules (not shown in FIG. 2), may still perform partition pruning on both query and DML operations even when the partition profiles have not been updated for all of the columns using remote calls since a buffer was added to an interval for at least one of the columns. The partition pruning may still be performed based on the fact that the columns are correlated.

Referring back to FIG. 1, the statistics module 114 of FIG. 1, as well as the statistics modules 214a and 214b of FIG. 2, may use one or more rules to determine a size of the buffer and/or when to use a remote call to invalidate and update a partition profile on other nodes. In one implementation, the statistics module 114 may include a learning mechanism to determine the size of the buffer and/or when to use a remote call to invalidate and update a partition profile on other nodes. For instance, a formula may be used to determine how to set new maximum values for an interval of a column, where the new maximum value includes the actual value plus a buffer amount. In one implementation, the statistics module 114 may account for the number of distinct values (d) in the original range of the interval. Then, the new_max=max+(max−min)* (d/4). In this manner, the range increases by one fourth. It is understood that other values may be used in the formula to change the range increases by other values.

In other alternative implementations, the learning mechanism may track how much the value increases within a configurable period of time and apply that information to determine how much and how often to increase the intervals using an actual value plus the buffer amount.

Figure 3:
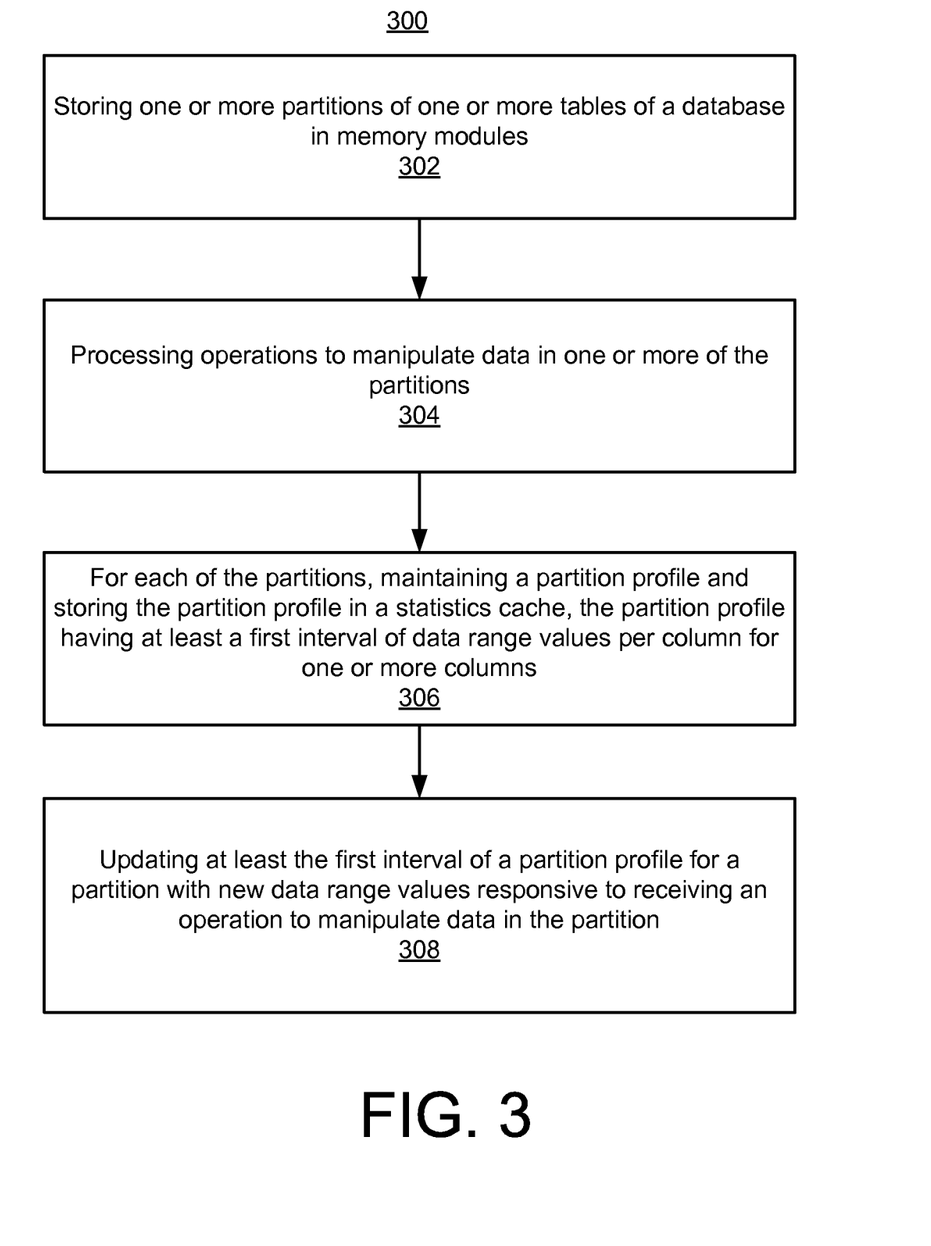
FIG. 3 is a flowchart illustrating example operations of the systems of FIG. 1 and FIG. 2.

Referring to FIG. 3, an example process 300 illustrates example operations of the systems 100 and 200 of FIGS. 1 and 2. Process 300 includes storing one or more partitions of one or more tables of a database in memory modules (302). For example, as discussed above with respect to FIG. 1, the memory modules 110 may store one or more partitions of one or more tables 108 of a database 100. In some implementations, disk-based storage device 112 and other storage devices (not shown) may be used to store one or more of the partitions as well.

Process 300 includes processing operations to manipulate data in one or more of the partitions (304). For example, the DML processor 104 is configured to process operations to manipulate data in one or more of the partitions. The operations may include DML operations, as discussed above in more detail.

Process 300 includes, for each of the partitions, maintaining a partition profile and storing the partition profile in a statistics cache, where the partition profile has at least a first interval of data range values per column for one or more of the columns (306). For example, the statistics module 114 maintains a partition profile 118 for each of the partitions and stores the partition profile 118 in the statistics cache 116. The partition profile 118 has at least a first interval 120 of data range values per column for one or more of the columns.

Process 300 includes updating at least the first interval of a partition profile for a partition with new data range values responsive to receiving an operation to manipulate data in the partition (308). For example, the statistics module 114 is configured to update at least the first interval of a partition profile for a partition with new data range values responsive to receiving an operation to manipulate data in the partition. In some implementations, the statistics module 114 updates the first interval with an actual data plus a buffer amount. As discussed above in more detail, the update to the first interval with the buffer amount works to reduce a number of remote calls made by the statistics module 114 on one node to statistic modules on other nodes when the partitions are distributed across multiple nodes in a distributed environment.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A system for pruning one or more partitions of a table having
multiple partitions using statistics of the partitions, the system comprising:
a database comprising one or more tables having multiple partitions, wherein the partitions are distributed across multiple nodes in a distributed environment and wherein a partition scheme of the partitions is based on a value range of a first column in each of the partitions, the database further comprising on each of the multiple nodes:
memory modules storing one or more of the multiple partitions of the tables;
a query processor configured to receive a query;
a data manipulation language (DML) processor configured to process operations to manipulate data in one or more of the partitions;
a statistics module that is operably coupled to the DML processor and to a statistics cache, wherein for each partition the statistics module maintains a partition profile and stores the partition profile in the statistics cache, the partition profile having at least a first interval of data range values per column for one or more columns,
wherein a statistics module of a first node is configured to:
determine that a DML processor of the first node processed a first operation that includes a first actual value exceeding a first maximum value of the first interval,
update at least the first interval of a partition profile for a partition by creating an updated maximum value of the first interval that equals the first actual value plus a buffer amount calculated based on a number of distinct values in the first interval of data range values, wherein the buffer amount is added to reduce a number of subsequent remote partition profile updates, and communicate a signal using a remote call to invalidate the profile partition on other nodes to send the updated partition profile to the other nodes, and wherein a statistics module of a second node is configured to:

receive the updated partition profile from the first node, the updated partition profile including the updated maximum value, determine that a DML processor of the second node processed a second operation that includes a second actual value that exceeds the first maximum value of the first interval but does not exceed the updated maximum value, and determine based on the second actual value not exceeding the maximum value, to not send a remote partition profile update; and a partition pruning module that is operably coupled to the query processor, the DML processor and the statistics module, wherein the partition pruning module is configured to include partitions responsive to a received query based on the partition profile.

2. The system of claim 1, wherein the statistics module of the first node applies one or more rules to calculate the buffer amount.

3. The system of claim 1, wherein the statistics module of the first node adjusts the buffer amount based on multiple updates to the first interval during a period of time.

4. The system of claim 1, wherein the partition pruning module is configured to include partitions responsive to a received query based on the partition profile and a second column of the partitions that is correlated to the first column.

5. A computer-implemented method for pruning one or more partitions of a table having multiple partitions using statistics of the partitions, the method comprising:

storing multiple partitions of one or more tables of a database in memory modules, wherein the multiple partitions are distributed across multiple nodes;

processing operations to manipulate data in one or more of the partitions;

for each of the partitions, maintaining a partition profile and storing the partition profile in a statistics cache, the partition profile having at least a first interval of data range values per column for one or more columns;

determining, by a statistics module of a first node that a DML processor of the first node processed a first operation that includes a first actual value exceeding a first maximum value of the first interval;

updating, by the statistics module of the first node, at least the first interval of a partition profile for a partition by creating an updated maximum value of the first interval that equals the first actual value plus a buffer amount calculated based on a number of distinct values in the first interval of data range values, wherein the buffer amount is added to reduce a number of subsequent remote partition profile updates, and communicating, by the statistics module of the first node, a signal using a remote call to invalidate the profile partition on other nodes to send the updated partition profile to the other nodes, and receiving, by a statistics module of a second node, the updated partition profile from the first node, the updated partition profile including the updated maximum value, determining, by the statistics module of the second node, that a DML processor of the second node processed a second operation that includes a second actual value that exceeds the first maximum value of the first interval but does not exceed the updated maximum value, and determining, by the statistics module of the second node, based on the second actual value not exceeding the maximum value, to not send a remote partition profile update.

6. The computer-implemented method of claim 5 further comprising:

including partitions responsive to a received query based on the partition profile.

7. The computer-implemented method of claim 5 wherein the first interval of the partition includes a maximum data value and a minimum data value.

8. The computer-implemented method of claim 5, wherein the partition profile includes the first interval and a second interval, wherein the first interval includes a first range of data values having a maximum data value and a minimum data value for the first range and the second interval includes a second range of data values having a maximum data value and a minimum data value for the second range.

9. The computer-implemented method of claim 5, further comprising applying one or more rules to calculate the buffer amount.

10. The computer-implemented of claim 9, further comprising adjusting the buffer amount based on multiple updates to the first interval during a period of time.

* * * * *